W. F. COCHRANE.
Bolting Flour.

No. 37,320.

3 Sheets—Sheet 1.

Patented Jan'y 6, 1863.

W. F. COCHRANE.
Bolting Flour.

No. 37,320.

3 Sheets—Sheet 2.

Patented Jan'y 6, 1863.

Witnesses:
J. Snowden Bell.
A. Pohlers.

Inventor:
Wm. F. Cochrane,
by his Attorney,
Wm. D. Baldwin

W. F. COCHRANE.
Bolting Flour.
No. 37,320.
3 Sheets—Sheet 3.
Patented Jan'y 6, 1863.
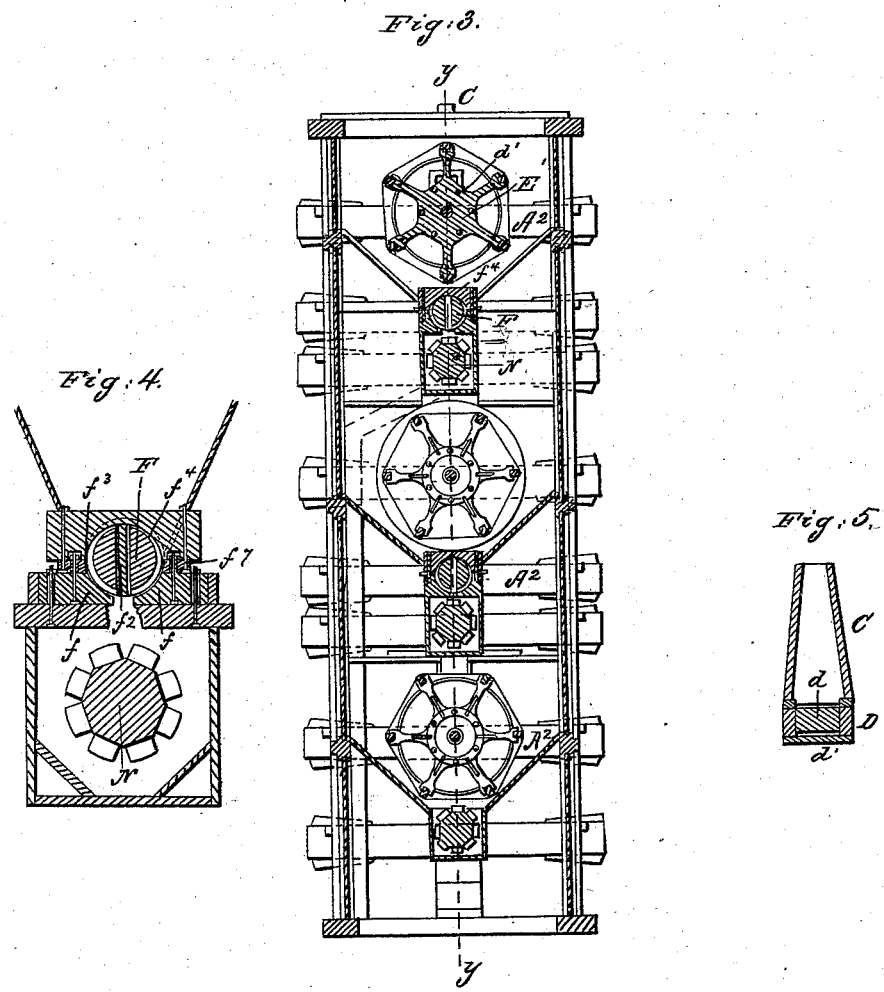

UNITED STATES PATENT OFFICE.

WILLIAM F. COCHRANE, OF SPRINGFIELD, OHIO, ASSIGNOR TO HIMSELF, AND WARDER & CHILD, OF SAME PLACE.

IMPROVEMENT IN BOLTING FLOUR.

Specification forming part of Letters Patent No. 37,320, dated January 6, 1863.

CASE D.

*To all whom it may concern:*

Be it known that I, WILLIAM F. COCHRANE, of Springfield, in the county of Clarke and State of Ohio, have invented certain new and useful Improvements in Bolting-Chests for Flouring-Mills, of which the following is a full, clear, and exact description, reference being had to the accompanying drawings, which make part of this specification, and in which—

Figure 1:
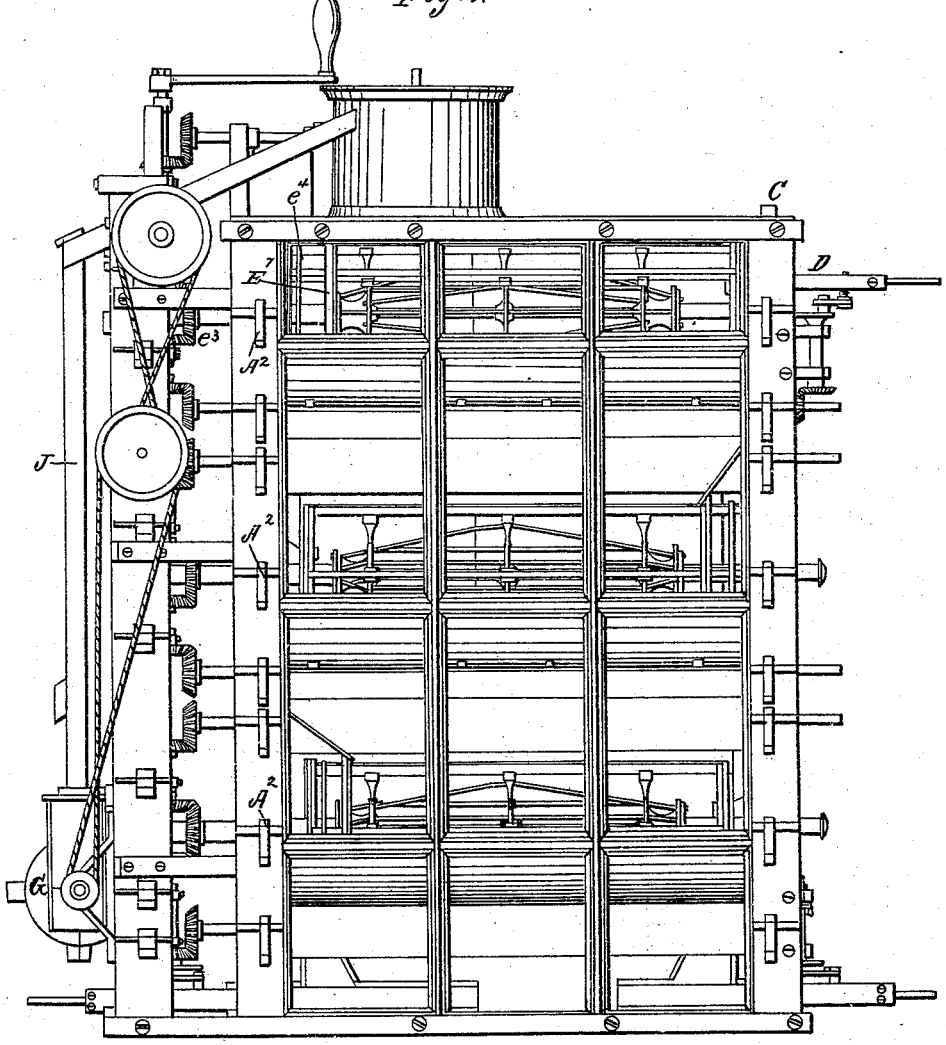
Figure 2:
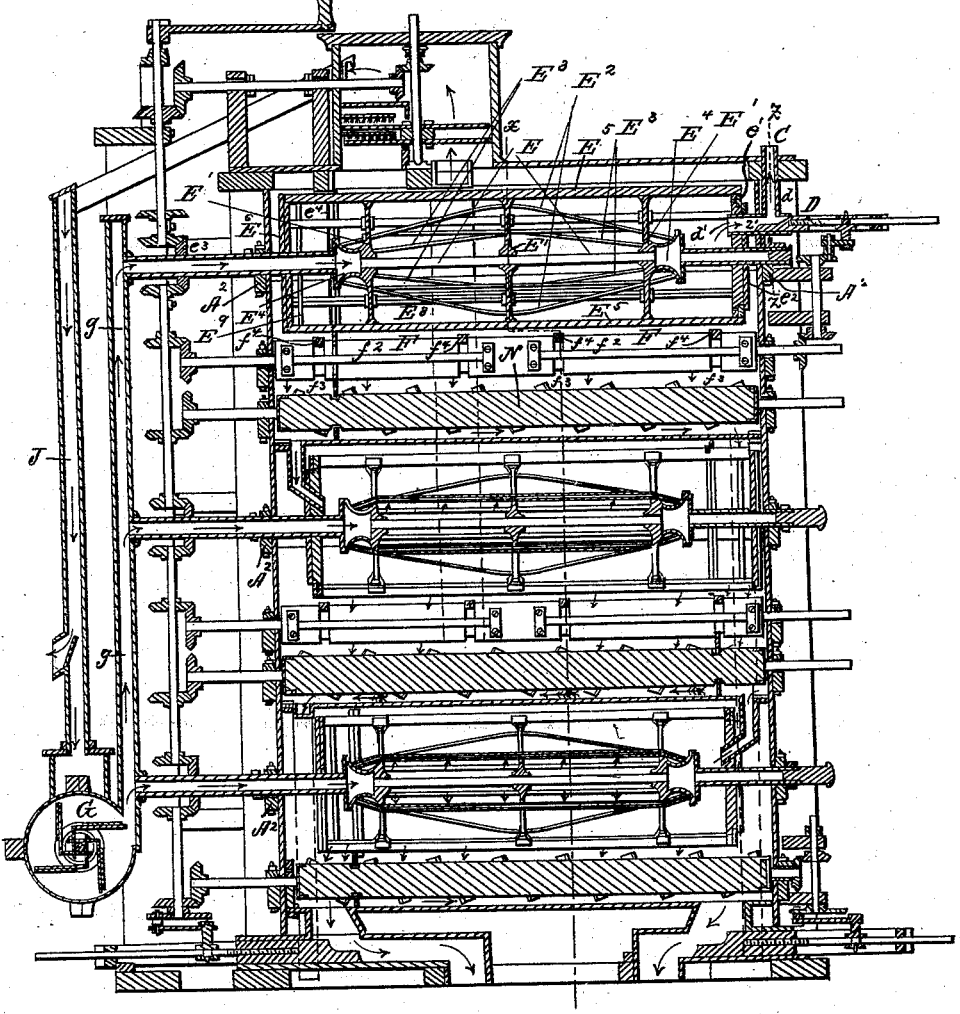

Figure 1 represents a view in elevation of a bolting-chest embracing my improvements, the panels which inclose the chest being removed to show the mechanism. Fig. 2 represents a vertical longitudinal section through the same at the line $y\ y$ of Fig. 3, the mechanism being shown partly in elevation and partly in section. Fig. 3 represents a vertical transverse section through the same at the line $x\ x$ of Fig. 2, looking toward the end opposite to that at which the gearing is located. Fig. 4 represents a similar section through one of the conveyers, valves, shafts, and brackets. Fig. 5 represents a similar section through the feeding-spout and pump, detached, at the line $z\ z$ of Fig. 2.

The mode of bolting flour ordinarily used in mills as heretofore constructed is attended by various difficulties. The meal, when first ground, is always hot and often damp, the heat being caused by the friction of the stones, and the dampness by the moisture absorbed by the grain previous to grinding. The bolting-cloth generally used is made of threads of silk covered with gum, in order to form a smooth, polished surface, that the flour may pass freely through the fine meshes of the cloth. The dampness and heat of the meal has a tendency to soften and dissolve this gum and make, instead of a polished surface to the thread, a sticky one to which the particles of flour adhere, and thus close and clog the meshes of the cloth, and also to cause the threads to swell, consequently decreasing the size of the pores. Without ventilation the air confined in the bolting-chest soon becomes heated and surcharged with moisture, which becomes condensed on the sides of the chest exposed to the influence of the outer atmosphere, thus causing the flour to "dough" or clog the chest and spouts. It is, moreover, found that in practice flour-bolts move regularly and in a better manner when the air inside the chest is kept at a certain uniform temperature, which temperature should be sometimes below and at other times above that of the external atmosphere. It has also been ascertained that as the fineness of the cloth increases the difficulties of bolting are correspondingly increased, owing to the "clouding" of the pores of the cloth with very fine flour. To obviate this difficulty various forms of "knockers" have been used, all of which, however, have a tendency to speck the flour, owing to the jarring of the reel, which drives through the cloth foreign substances, which would not otherwise escape. My invention, therefore, has reference to that class of bolting-chests in which atmospheric pressure is employed to facilitate the process of bolting, and has for its object the production of a machine which shall combine the advantages of previous machines while avoiding their defects, and which shall also be capable of yielding an increased quantity and an improved quality of flour from a given quantity of grain, to which ends the improvements claimed under this patent, consist, first, in arranging a series of perforated tubes around the central shaft of the reel, through which tubes a current of air is caused to pass by the pressure of the blast, whereby the force of the blast is caused to act close to the surface of the bolting-cloth; secondly, in a device for holding the central portion of the reel-head, through which the feed-spout passes, stationary while its outer part revolves freely without permitting the escape of the blast or fine flour; thirdly, in forming a dead-air chamber at the tail-end of the reel, into which the offal falls, whereby its separation from the fine flour is effectually secured; fourthly, in a device whereby the bolted flour and also the offal is carried from the bolting-chest, while at the same time the escape of the blast is prevented; fifthly, in a device for conveying the offal from the chamber in which it first falls from the tail of the reel.

To carry out the objects of my invention in the most perfect manner, I have found it necessary to remodel almost entirely the bolting-chests heretofore used. The reel consists of a central shaft, turning in suitable bearings in the frame-work, and surrounded by a series of perforated tubes, through which a current of air is forced. The reel is strongly braced and provided with ribs or vanes to which the bolting-cloths may be fastened. The feeding-head of the reel is made in two parts, one of which is stationary and the other movable. A feeding-spout passes through the stationary part. The movable part of the reel head consists of a ring which rotates around the central head, and to which the ends of the ribs are attached. This ring runs in a groove in the stationary head, by which means the escape of flour or air through the joint is prevented. The other head of the reel may be composed of a single solid piece. A flanged ring is secured around the reel near its tail end, and revolves in contact with a partition extending entirely across the bolting-chamber to divide it into two compartments, one for the flour, the other for the offal. This latter compartment forms a tight chamber, into which no current passes, as neither the pipes nor the perforated portion of the reel-shaft extends into it, and thus no dust from the flour portion of the reel is carried into the offal-chamber. A rotating shaft extends beneath the reel-chest, and has a slot through it, in which a board or plunger is caused to reciprocate in such manner that a space is left in the slot on top of the shaft, in which the flour collects, and then, when the shaft has performed half a revolution, the flour is pushed out by the sliding of the board, which at the same time leaves a space on the upper side of the shaft, thus forming, as it were, a double-acting reciprocating pump. A similar device serves to clear the offal or dead-air chamber. The valve-shaft rotates in concave blocks having strips upon them, which blocks are made adjustable in order to make them fit accurately to the shaft.

In the accompanying drawings, which represent a convenient arrangement of parts for carrying out the objects of my invention, my improvements are shown as applied to a bolting-chest, consisting of a series of three reels arranged one above the other, for convenience of construction and operation. A pump, D, is placed across the lower end of the feeding-spout C, to feed the meal to the reel. This pump consists of a reciprocating plunger, $d$, playing horizontally in a trough, $d'$, passing through the head of the reel E.

In order to bring down the meal more effectually, I form a series of steps, 1 2, on the face of the plunger, as shown in Fig. 2. By this means the escape of the blast up the feed-spout is prevented, noise or jarring is avoided, and the amount of feed accurately regulated. The reel, in this instance, extends the whole length of the bolting-chest, and its shaft turns freely in bearings in the bridge-trees $A^2$ of the frame. This shaft E is solid, except at the ends, which are hollow, and bell-shaped inside the bearings. The outer ends of the hollow part of the reel-shaft are closed by movable plugs, in order that the pipes may be open to clean them when desired, as the dust is apt to settle in them when the blast is stopped. Spiders E' are arranged upon the shaft E at right angles thereto, and are firmly braced by the tie-rods $E^2$. A series of perforated air-tubes, $E^3$, is arranged around the central shaft with their ends inserted into the bell-mouths $E^4$. Ribs $E^5$, to which the bolting-cloths are secured, are inserted into slots in these spiders. The tail end of the reel is closed by a solid board, $E^6$. As the pump-trough $d'$ passes through the head of the reel, its central portion, $e$, must necessarily be stationary, while the reel-shaft revolves freely within it. As the periphery of the reel also revolves around the central part, a joint must be formed where the two parts meet. Now, as the reel when in operation is always under the pressure of the blast, I have found some trouble in making a joint which would permit the reel to work easily, and yet be tight enough to prevent the escape of the blast. I have, however, succeeded in accomplishing this object very successfully by the following mode of construction. Upon the inner side of the head $e$ I form a flange or rim, while to the outer side I attach a square board, $e^2$, projecting beyond the central head, the space between the flange and board thus forming an annular groove around the head. A ring or circle, $e'$, is attached to the periphery of the reel, and is provided with a rim fitting into this groove. A flanged ring, $e^4$, is secured upon the reel near its tail end, and rotates freely within a hole cut in the partition $E^7$, which separates the flour-chamber $E^8$ from the offal-chamber $E^9$. The reel is thus left free to revolve, while any communication between the two chambers is effectually cut off; consequently, the offal and flour remain in their respective compartments without mixing.

Air is supplied to the reel in the following manner: As before stated, the end of the reel-shaft which carries the bevel-pinion $e^3$ is hollow, extends through the pinion and forms a close joint with an air-pipe, $g$, leading from a fan, G. The shaft revolves freely, but the air-pipe is of course stationary.

The reel-chamber is divided into two compartments of unequal size by a partition, $E^7$, which encircles the reel and fits snugly on a flanged ring, $e^4$, upon the reel. The larger compartment, $E^8$, is for the reception of the fine flour, which passes through the bolting-cloths, while the smaller one, $E^9$, forms a dead-air chamber, into which the tailings or offal fall, a portion of the tail end of the reel being left open for that purpose, the remaining portion within the offal-chamber being covered with coarse wire to distribute the offal properly.

To carry off the fine flour and offal from the chambers into which they respectively fall, without mixing and without permitting the blast to escape, I arrange a revolving shaft, F, in the bolting-chest beneath the reel. This shaft fits accurately into concave blocks or strips $f$, whose inner sides are curved to suit it. Above these blocks are strips or base-boards $f^7$, upon which the ends of the cant-boards rest. The blocks $f$ are provided with slots and set-screws to adjust them relatively to the shaft, as shown in Fig. 4. This shaft F has a long slot cut entirely through it, into which slot a board, $f^2$, fits. The width of this board is somewhat less than the diameter of the shaft, and it fits closely in the slot, but is free to reciprocate transversely in it. Shallow annular grooves or channels $f^3$ are cut into the shafts at intervals. Brackets $f^4$, curved on their under side near their centers to correspond with the grooves $f^3$, are secured upon the base-boards $f^7$, and serve both to hold the base boards and shaft together, and as a guide or cam to work the reciprocating board or plunger $f^2$. The arrangement of the brackets is such that when the plunger-board $f^2$ is vertical, a cavity or channel in which the flour or offal is collected is left in the upper side of the shaft; but when the shaft revolves the board is pressed down, leaving a similar channel on the other side, now uppermost, and forcing out the flour or offal into a conveyer, N, below, through an opening between the concave blocks $f$. The details of the construction and operation of the valve-shaft are clearly shown in Figs. 2 and 4 of the drawings.

The manner in which the various parts of the mechanism are driven is clearly represented in Figs. 1 and 2 of the drawings, but as the mere details of the gearing may be varied in many ways without departing from the spirit of my invention, and as they form no part of the subject-matter herein claimed, a detailed description of these parts is deemed unnecessary here.

The description of other portions of the mechanism are in like manner omitted here, as they are fully set forth in other applications for Letters Patent filed simultaneously with this, and marked, respectively, "A," "B," and "C."

The accompanying drawings represent three reels arranged one above the other. In describing the operation of the parts claimed under this patent, I shall do so as if only one reel were employed, the others being merely a reduplication of the first one. The gearing is put in motion from any suitable prime mover. The meal descends through the feeding-spout C into the pump D, by which it is injected at intervals into the bolting-rod E, by which it is bolted, the process being assisted by a strong blast from the fan G. The fine flour drops upon the valve-shaft F, by which it is carried round and dropped upon the conveyer N, which conveys it into a suitable receptacle. The offal falls from the tail end of the reel into the dead-air chamber $E^9$, which is provided with a suitable pump-valve or cut-off, to convey it away without permitting the air to escape with it. The offal may pass into a bin to be again elevated and rebolted, or it may be passed through a coarser reel, or a series of reels arranged one above the other, as shown in the drawings, which latter method I prefer. The red arrows indicate the course taken by the flour in its passage through the chest, the blue lines the direction of the current of air, and the black arrows the course of the offal.

What I claim under this patent as my invention is—

1. The combination of the reel-shaft E, bell-mouthed air-chambers $E^4$, and reel-arms $E'$, with the perforated tubes $E^3$, as and for the purpose described.

2. The combination of the stationary reel-head $e$, revolving ring $e'$, and flanges $e^2$ $e^3$, when constructed and arranged as herein described, for the purpose set forth.

3. Forming a dead-air chamber at the tail end of a bolting-reel, into which the offal may fall, and thus be prevented from specking or mixing with the superfine flour, and preventing the flying dust from the flour-chamber from passing into the offal, substantially in the manner herein described.

4. The combination of a dividing-board or partition, $E^7$, and flanged ring $e^4$ with a bolting-reel, substantially as described, for the purpose set forth.

5. Conveying the fine flour from the bolting-reel to the conveyer or other receptacle by means of a valve or pump, F, which passes the flour freely, but prevents the escape of air, substantially in the manner described.

6. The combination of the reel E, valve-shaft F, and conveyer N, substantially in the manner described.

7. The combination of the valve-shaft F, base-boards $f^7$, and adjustable concave blocks $f$, as described.

8. The combination of the slotted shaft F, reciprocating board or plunger $f^2$, channels $f$, and brackets $f^4$, substantially as described.

9. The combination of a pump-trap or cut-off with the dead-air chamber $E^9$, substantially in the manner described, for the purpose of discharging the offal therefrom.

In testimony whereof I have hereunto subscribed my name.

WILLIAM F. COCHRANE.

Witnesses:
S. A. BOWMAN,
WARDER CUMMING.